United States Patent [19]

Rivas et al.

[11] Patent Number: 5,725,609
[45] Date of Patent: Mar. 10, 1998

[54] WATER IN VISCOUS HYDROCARBON EMULSION COMBUSTIBLE FUEL FOR DIESEL ENGINES AND PROCESS FOR MAKING SAME

[75] Inventors: Hercilio Rivas; Gustavo A. Nuñez; Tulio Colmenares; Manuel Chirinos, all of Caracas, Venezuela

[73] Assignee: Intevep, S.A., Caracas, Venezuela

[21] Appl. No.: 599,305

[22] Filed: Feb. 9, 1996

[51] Int. Cl.$^6$ ........................................... C10L 1/00
[52] U.S. Cl. ........................ 44/301; 252/312; 431/4; 123/25 A
[58] Field of Search ............... 44/301, 302; 252/308, 252/309, 310, 311, 311.5, 312; 431/4; 123/25 A

[56] References Cited

U.S. PATENT DOCUMENTS

| | | | |
|---|---|---|---|
| 2,920,948 | 1/1960 | Weeks | 44/301 |
| 4,295,859 | 10/1981 | Boehmke | 44/301 |
| 4,315,755 | 2/1982 | Hellsten et al. | 44/301 |
| 4,696,638 | 9/1987 | DenHerder | 44/301 |
| 4,976,745 | 12/1990 | Rodriguez et al. | 44/301 |

FOREIGN PATENT DOCUMENTS 58160392  9/1993  Japan.

*Primary Examiner*—Prince Wills, Jr.
*Assistant Examiner*—Cephia D. Toomer
*Attorney, Agent, or Firm*—Bachman & LaPointe, P.C.

[57] ABSTRACT

A combustible fuel for diesel engines and a process for forming same in the form of a water in hydrocarbon emulsion wherein the mean water drop diameter is $\leq 4$ μm with a maximum diameter of $\leq 10$ μm.

3 Claims, No Drawings

WATER IN VISCOUS HYDROCARBON EMULSION COMBUSTIBLE FUEL FOR DIESEL ENGINES AND PROCESS FOR MAKING SAME

BACKGROUND OF THE INVENTION

The present invention relates to a process for utilizing a viscous hydrocarbon as a combustible fuel for diesel engines as well as a combustible fuel product.

It is well known in the art to form hydrocarbon in water emulsions either from naturally occurring bitumens or residual oils in order to facilitate the production and/or transportation of these viscous hydrocarbons. Typical processes are disclosed in U.S. Pat. Nos. 3,380,531; 3,467,195; 3,519,006; 3,943,954; 4,099,537; 4,108,193; 4,239,052; and 4,570,656. In addition to the foregoing, the prior art teaches that hydrocarbon in water emulsions formed from naturally occurring bitumens and/or residual oils can be used as combustible fuels. See for example U.S. Pat. Nos. 4,144,015; 4,378,230; 4,618,348; and British Patent Specification 974,042.

The hydrocarbon in water emulsions discussed above, while useful as combustible fuels in some power plants, are not suitable for burning in diesel engines, particularly low speed diesel engines. Naturally, it would be highly desirable to be able to use viscous naturally occurring bitumens and/or residual oils as a combustible fuel for diesel engines.

Accordingly, it is the principal object of the present invention to provide a process for utilizing a viscous hydrocarbon as a combustible fuel for diesel engines.

It is a particular object of the present invention to provide a process as aforesaid wherein the viscous hydrocarbon is in the form of a naturally occurring bitumen or residual oil.

It is a further object of the present invention to provide a combustible fuel for diesel engines in the form of a water in hydrocarbon emulsion.

Further objects and advantages of the present invention will appear hereinbelow.

SUMMARY OF THE INVENTION

The present invention relates to a process for utilizing a viscous hydrocarbon as a combustible fuel for diesel engines as well as a combustible fuel product.

In accordance with the process of the present invention the viscous hydrocarbon is formed as a hydrocarbon in water emulsion in order to facilitate the production and transportation of the viscous hydrocarbon to the burning site. The hydrocarbon in water emulsion may be prepared by any known process as described in the patents discussed above or as disclosed in U.S. Pat. Nos. 4,801,304; 4,795,478; 4,834,775; 4,923,483; 4,824,439; 4,994,090; 4,776,977; 4,781,819; 4,806,231; and 4,915,819. Additional known processes for forming hydrocarbon in water emulsions are disclosed in U.S. Pat. Nos. 4,934,398; 4,618,348; 4,666,457; 4,684,372; and 4,793,826.

In accordance with the process of the present invention, the hydrocarbon in water emulsion is formed having a hydrocarbon in water ratio of from about 60:40 to about 90:10, preferably, 65:35 to 75:25. The hydrocarbon in water emulsion is formed by employing a non-ionic surfactant. The non-ionic surfactant is present in the emulsion in an amount of greater than or equal to 2000 ppm. The non-ionic surfactant is required to have an ethylene oxide content of greater than or equal to 10 and, preferably, between about 10 to 100. The viscous hydrocarbons usable in the process of the present invention are those hydrocarbons characterized by an API gravity of less than or equal to 16° API and a viscosity of greater than or equal to 100 cPs at 122° F.

The hydrocarbon in water emulsion described above is subjected to inversion by heating the hydrocarbon in water emulsion to an elevated temperature and mixing the emulsion at the elevated temperature so as to invert the emulsion from a hydrocarbon in water emulsion to a water in hydrocarbon emulsion. In accordance with the present invention, it is critical that the resulting water in hydrocarbon emulsion product have a mean water droplet diameter of less than or equal to 4 microns (μm) and a maximum drop diameter of less than or equal to 10 microns (μm). In order to obtain a combustible fuel product which may be utilized in diesel engines the drop diameter of the resulting water in hydrocarbon emulsion must be controlled. The diameter of the water droplets is controlled by the following factors:

(1) the temperature at which the hydrocarbon in water emulsion is heated for inversion;
(2) the concentration of the non-ionic surfactant;
(3) the EO content of the non-ionic surfactant;
(4) the mixing energy employed during the inversion process; and
(5) the ratio of hydrocarbon to water in the original hydrocarbon in water emulsion.

Specifically, the temperature and mixing energy at which the inversion takes places increases with an increase in concentration and EO content of the surfactant and with a decrease in the hydrocarbon content.

Control of the water droplet size and the resulting water in hydrocarbon emulsion is critical in that (1) the presence of water allows for a more complete combustion in a diesel engine, (2) small water droplet sizes assist in atomization, and (3) the fuel can be combusted at lower temperatures which correspondingly result in lower formations of NOX products as well as less formation of soot.

Further advantages and features of the present invention will appear hereinbelow from a consideration of the detailed description.

DETAILED DESCRIPTION

The present invention is drawn to a process for utilizing a viscous hydrocarbon as a combustible fuel for diesel engines as well as a combustible fuel product for diesel engines in the form of a water in hydrocarbon emulsion.

The viscous hydrocarbons employed in the process of the present invention include naturally occurring bitumens and residual oils characterized by an API gravity of less than or equal to 16° API and a viscosity of greater than or equal to 100 cPs at 122° F. These viscous hydrocarbons in accordance with the present invention are handled for transportation purposes by forming a hydrocarbon in water emulsion. In accordance with the process of the present invention formation of the hydrocarbon in water emulsion employs the use of a non-ionic surfactant as an emulsifier. The hydrocarbon in water emulsion is characterized by a hydrocarbon to water ratio of from about 60:40 to about 90:10, preferably 65:35 to about 75:25. The non-ionic surfactant is required to have an ethylene oxide content (EO content) of greater than or equal to 10 and preferably between about 10 to 100. In accordance with the present invention, the non-ionic surfactant is present in the emulsion in an amount of greater than or equal to 2000 ppm. The hydrocarbon in water emulsion may be formed by any process known in the art. Suitable processes are disclosed for example in U.S. Pat. Nos. 4,776,977 and 4,934,398 and others discussed above.

In order to obtain a viscous hydrocarbon combustible fuel the hydrocarbon in water emulsion described above must be inverted into a water in hydrocarbon emulsion. In accordance with the present invention a suitable combustible fuel product for diesel engines comprises a water in hydrocarbon emulsion wherein the droplet size of the water within the emulsion are within critical values. It has been found that in order to get a more complete combustion at lower temperatures with minimal formations of nitric oxides and soot, the water in hydrocarbon emulsion combustible fuel for diesel engines should have a mean droplet diameter of less than or equal 4 microns with a maximum water drop diameter of less than or equal to 10 microns. Such a combustible fuel emulsion product having a water to hydrocarbon ratio of 40:60 to about 10:90 preferably 35:75 to about 25:75 and a non-ionic surfactant content of greater than 2000 ppm and an EO content of preferably between 10 to 100 may be effectively atomized at lower temperatures and obtain complete combustion. When the water droplet diameters exceed the critical values set forth above, atomization of the fuel becomes incomplete, combustion efficiency is greatly decreased, and elevated temperatures are required for combustion thus resulting in the formation of high amounts of soot and NOX pollutants.

The water in hydrocarbon emulsion fuel product for use as a combustible fuel in a diesel engine is obtained from the hydrocarbon in water emulsion formed for transportation of the viscous hydrocarbon by subjecting the hydrocarbon in water emulsion to a controlled inversion process. In accordance with the present invention, the hydrocarbon in water emulsion is inverted at elevated temperature, that is, greater than or equal to 90° C., and critical mixing energies, that is, greater than or equal to $6 \times 10^6$ J/m³ so as to invert the emulsion into a water in hydrocarbon emulsion having the required water droplet diameters, both mean and maximum. The inversion of the emulsion is controlled by controlling the temperature and mixing energy during the inversion process wherein the temperature is a function of the concentration and EO content of the non-ionic surfactant and the mixing energy is a function of the hydrocarbon content of the hydrocarbon in water emulsion. The temperatures required are greater than or equal to 90° C. and mixing energies of greater than or equal to $6.00 \times 10^6$ J/m³. As will be made clear from the examples hereinbelow, the inversion process is a function of temperature, mixing energy as well the nature of the non-ionic surfactant (EO content), the amount of the surfactant in the emulsion, the nature of the viscous hydrocarbon and the hydrocarbon content.

Advantages of the present invention will be made clear from a consideration of the following examples.

EXAMPLE 1

Four samples of hydrocarbon in water emulsions where prepared for inversion having a hydrocarbon to water ratio of 70:30 wherein the viscous hydrocarbon had an API gravity of 8.5° and a viscosity of 700 cPs at 86° F. The four samples were formed employing a non-ionic surfactant in a concentration of 3000 ppm and an EO content of 13, 17, 33 and 38 respectively. Each of the four samples were heated to temperatures of 80° C., 90° C. and 100° C. and mixed with a mixing energy of $8.5 \times 10^6$ J/m³. The time required to invert the emulsions and the resulting water droplet maximum and mean diameters where determined. The results are shown below in Table I.

TABLE I

| | Temp. (°C.) | | |
|---|---|---|---|
| Surfactant EO | 80 | 90 | 100 |
| 13 | 22 sec | 10 sec | 5 sec |
| 17 | 280 sec | 200 sec | 80 sec |
| 33 | 800 sec | 600 sec | 250 sec |
| 38 | 1200 sec | 800 sec | 350 sec |
| Average Drop Dia. | | | |
| Max | 20 µm | 10 µm | 6 µm |
| Mean | 10 µm | .5 µm | 2 µm |

From the foregoing it can be seen that the time for inversion increases with EO content and decreases with temperature. The average drop diameter both max and mean decreases with an increase in temperature.

EXAMPLE 2

Additional emulsions were prepared as in Example 1 wherein the content of the hydrocarbon was increased to 75:25 and 80:20. The emulsions were inverted at a temperature of 90° C. and a mixing energy of $8.5 \times 10^6$ J/m³. The results are given in Table II.

TABLE II

| | Hydrocarbon Content (%) | | |
|---|---|---|---|
| Surfactant EO | 70 | 75 | 80 |
| 13 | 10 sec | 10 sec | 4 sec |
| 17 | 200 sec | 100 sec | 20 sec |
| 33 | 600 sec | 100 sec | 30 sec |
| 38 | 800 sec | 120 sec | 35 sec |
| Average Drop Dia. | | | |
| Max | 8 µm | 8 µm | 6 µm |
| Mean | 4 µm | 4 µm | 2 µm |

From Table II it can be seen that as the hydrocarbon content increases the time for inversion decreases with a decrease in average drop diameter both max and mean.

EXAMPLE 3

Emulsions were prepared as in Example 2 except that the surfactant concentration was reduced to 2000 ppm. The results are shown in Table III.

TABLE III

| | Temp. (°C.) | | |
|---|---|---|---|
| Surfactant EO | 80 | 90 | 100 |
| 13 | 20 sec | 10 sec | 5 sec |
| 17 | 200 sec | 100 sec | 60 sec |
| 33 | 500 sec | 300 sec | 100 sec |
| 38 | 700 sec | 400 sec | 200 sec |
| Average Drop Dia. | | | |
| Max | 25 µm | 8 µm | 5 µm |
| Mean | 10 µm | 4 µm | 2 µm |

From the foregoing it is clear that inversion time decrease with and decrease in surfactant concentration as does average drop diameter as a function of temperature.

EXAMPLE 4

Emulsions were prepared as in Example 1 using a surfactant having an EO content of 17. The emulsions were inverted under varying conditions of elevated temperature and mixing energy. The results are shown in Table IV and Table V.

TABLE IV

| Mixing Energy ($10^6$ J/m$^3$) | 3.6 | 8.5 | 13.1 | 15.5 |
|---|---|---|---|---|
| Temp °C. | | | | |
| 90 | 800 | 200 | 180 | 120 |
| 95 | 400 | 150 | 60 | 40 |
| 100 | 320 | 100 | 50 | 10 |

TABLE V

| AT TEMP OF 90 °C. | Average Drop Diameter | |
|---|---|---|
| Mixing Energy ($10^6$ J/m$^3$) | Max | Mean |
| 3.6 | 15 | 8 |
| 8.5 | 10 | 5 |
| 13.1 | 6 | 3 |
| 15.5 | 5 | 2 |

As can be seen from Tables IV and V, as the mixing energy increases, the average drop diameter both max and mean decreases as does inversion time.

As can be seen from the foregoing, the process of the present invention allows for the formation of a combustible fuel in the form of a water in hydrocarbon emulsion which allows for utilization of viscous hydrocarbons as combustible fuels in low speed diesel engines.

This invention may be embodied in other forms or carried out in other ways without departing from the spirit or essential characteristics thereof. The examples described above are therefore considered as illustrative and not restrictive, the scope of the invention being indicated by the apended claims and all changes which come within the meaning and range of equivalency are intended to be embraced therein.

What is claimed is:

1. A process for utilizing a viscous hydrocarbon as a combustible fuel for a diesel engine comprising:

(a) providing a hydrocarbon in water emulsion having a hydrocarbon to water ratio of from about 60:40 to about 90:10 and a non-ionic surfactant in an amount of $\geq 2000$ ppm, said hydrocarbon being characterized by an API gravity of $\leq 16°$ API and a viscosity of $\geq 100$ cPs at 122° F. and said surfactant having an ethylene oxide (EO) content of $\geq$ about 10;

(b) subjecting said hydrocarbon in water emulsion to temperature and mixing energy conditions so as to invert said hydrocarbon in water emulsion into a water in hydrocarbon emulsion characterized by a mean water drop diameter of $\leq 4$ μm and a maximum drop diameter of $\leq 10$ μm, wherein the temperature increases with an increase in the EO content of the surfactant and the mixing energy increases with a decrease in the hydrocarbon content;

(c) atomizing said water in hydrocarbon emulsion; and (d) burning the water in hydrocarbon emulsion in a diesel engine.

2. A process according to claim 1 wherein said temperature is $\geq 90°$ C. and said mixing energy is $\geq 6.00 \times 10^6$ J/m$^3$.

3. A process according to claim 1 wherein said (EO) content is between about 10 to 100.

* * * * *